United States Patent
Lu et al.

(10) Patent No.: US 6,370,617 B1
(45) Date of Patent: Apr. 9, 2002

(54) NON-STALLING PIPELINE TAG CONTROLLER

(75) Inventors: Chung-Yen Lu, Taipei; Ming-Hao Liao, Hsin-Chiu, both of (TW)

(73) Assignee: Silicon Integrated Systems Corp., Hsin-Chu (TW)

(*) Notice: Subject to any disclaimer, the term of this patent is extended or adjusted under 35 U.S.C. 154(b) by 0 days.

(21) Appl. No.: 09/546,894

(22) Filed: Apr. 10, 2000

(51) Int. Cl.[7] .............................................. G06F 12/00
(52) U.S. Cl. ........................ 711/118; 711/167; 711/168; 711/169
(58) Field of Search ................................ 711/118, 167, 711/168, 169

(56) References Cited

U.S. PATENT DOCUMENTS 5,367,569 A * 11/1994 Roach et al. ............... 379/412
5,497,470 A *  3/1996 Liencres ....................... 711/3
5,768,140 A *  6/1998 Swartz et al. .......... 364/478.13

* cited by examiner

Primary Examiner—Do Hyun Yoo
Assistant Examiner—Mehdi Namazi
(74) Attorney, Agent, or Firm—Ladas & Parry

(57) ABSTRACT

A non-stalling pipeline tag controller includes cascaded source and holding registers coupled respectively to an external input unit and a data memory module. A tag memory module includes a tag memory unit for storing tags to memory data in the data memory module, and a first comparator unit that generates a first decision signal to indicate whether the source tag in the source register matches with one of the tags in the tag memory unit. A status module includes a second comparator unit that generates a second decision signal to indicate whether the source tags stored in the source and holding registers match with one another, and a decision unit that compares the first and second decision signals and that generates a third decision signal to indicate occurrence of a cache hit or cache miss condition. An arbitration module generates a control signal for enabling access to the data memory module according to the source tag from the holding register upon detection of the cache hit condition, and generates a replacement address that is provided to the tag memory module so as to enable storage of the source tag from the holding register in the tag memory unit according to the replacement address in order to update the tag memory unit upon detection of the cache miss condition.

5 Claims, 7 Drawing Sheets

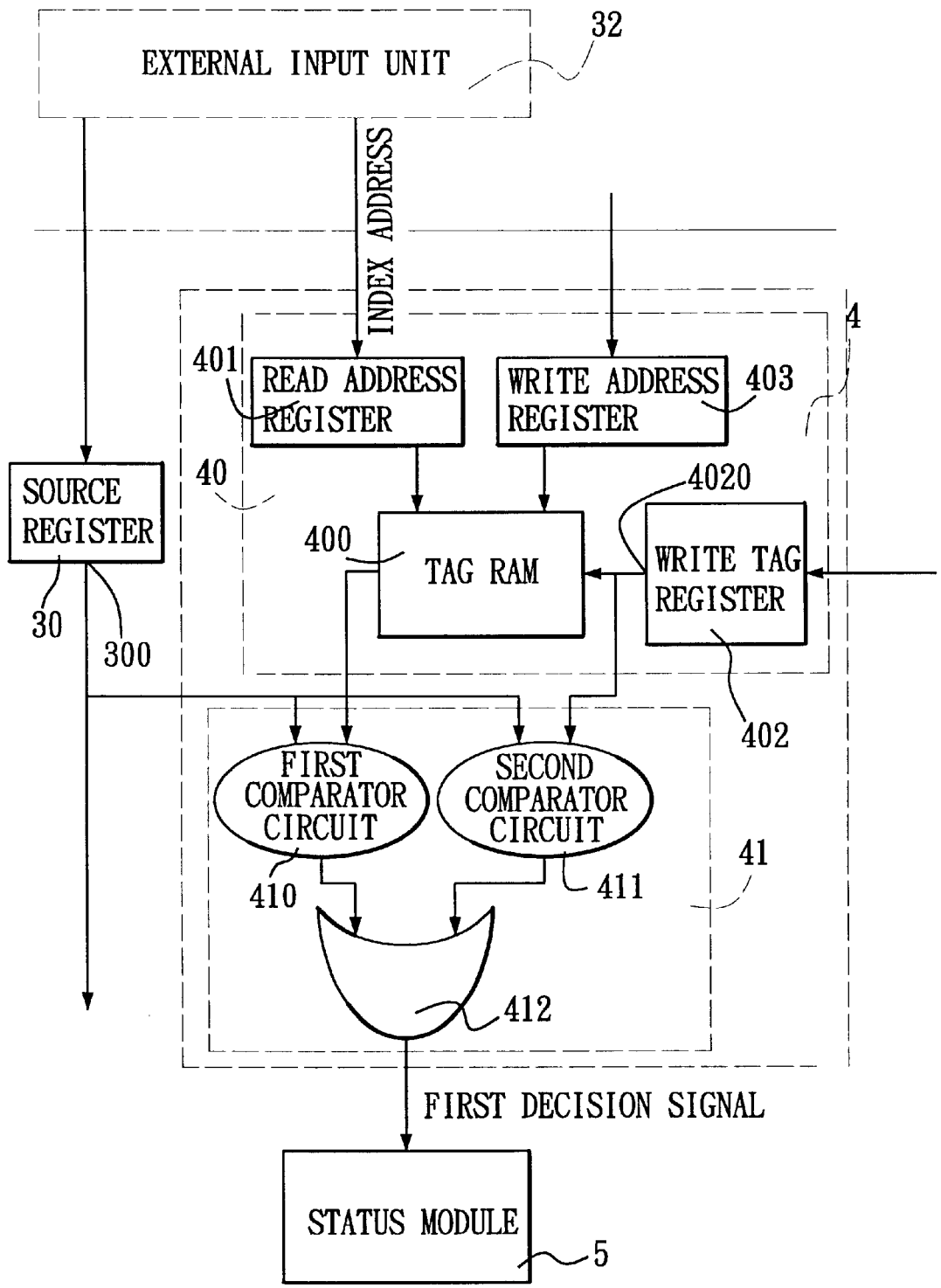
F I G. 3

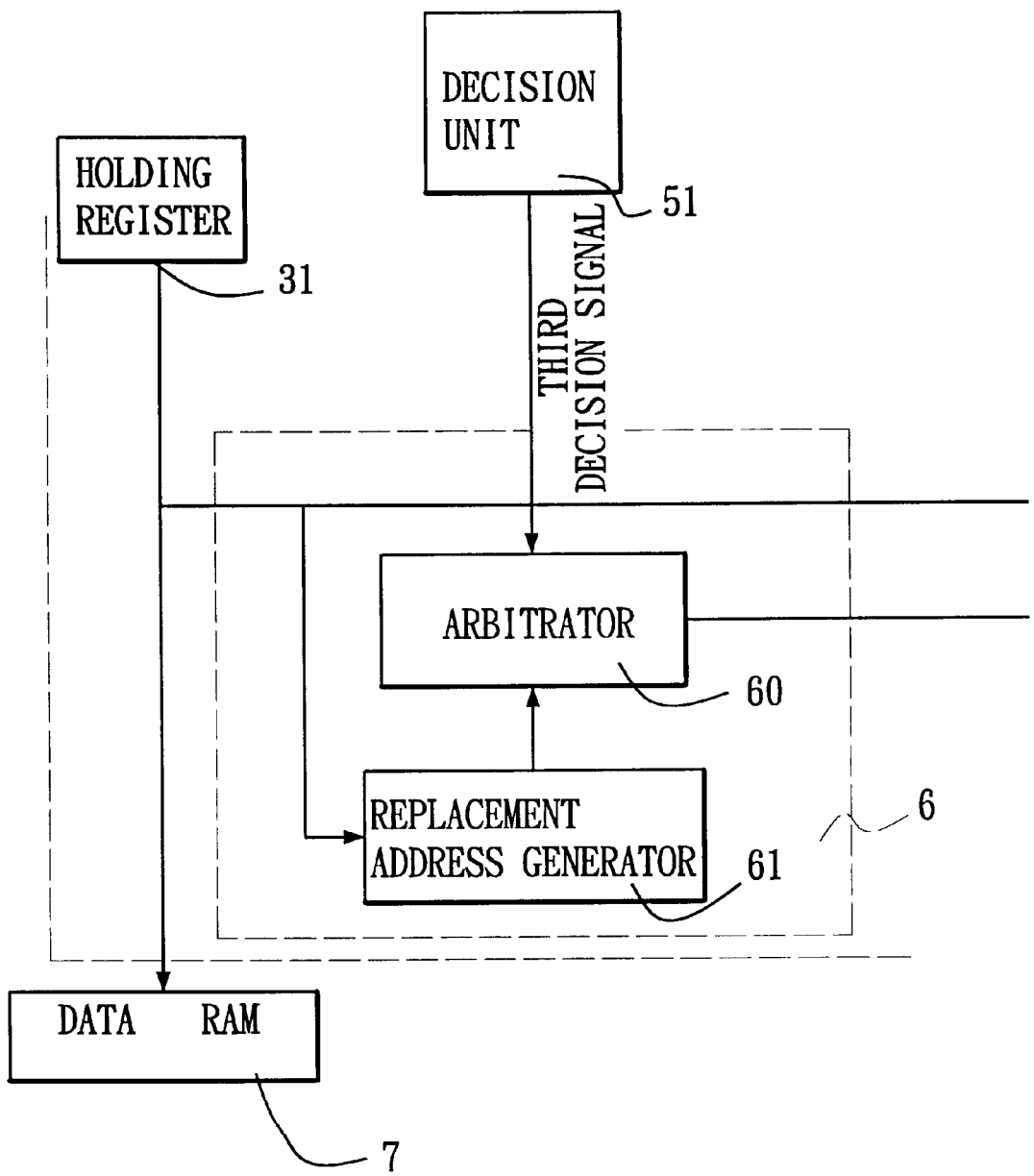
F I G. 5

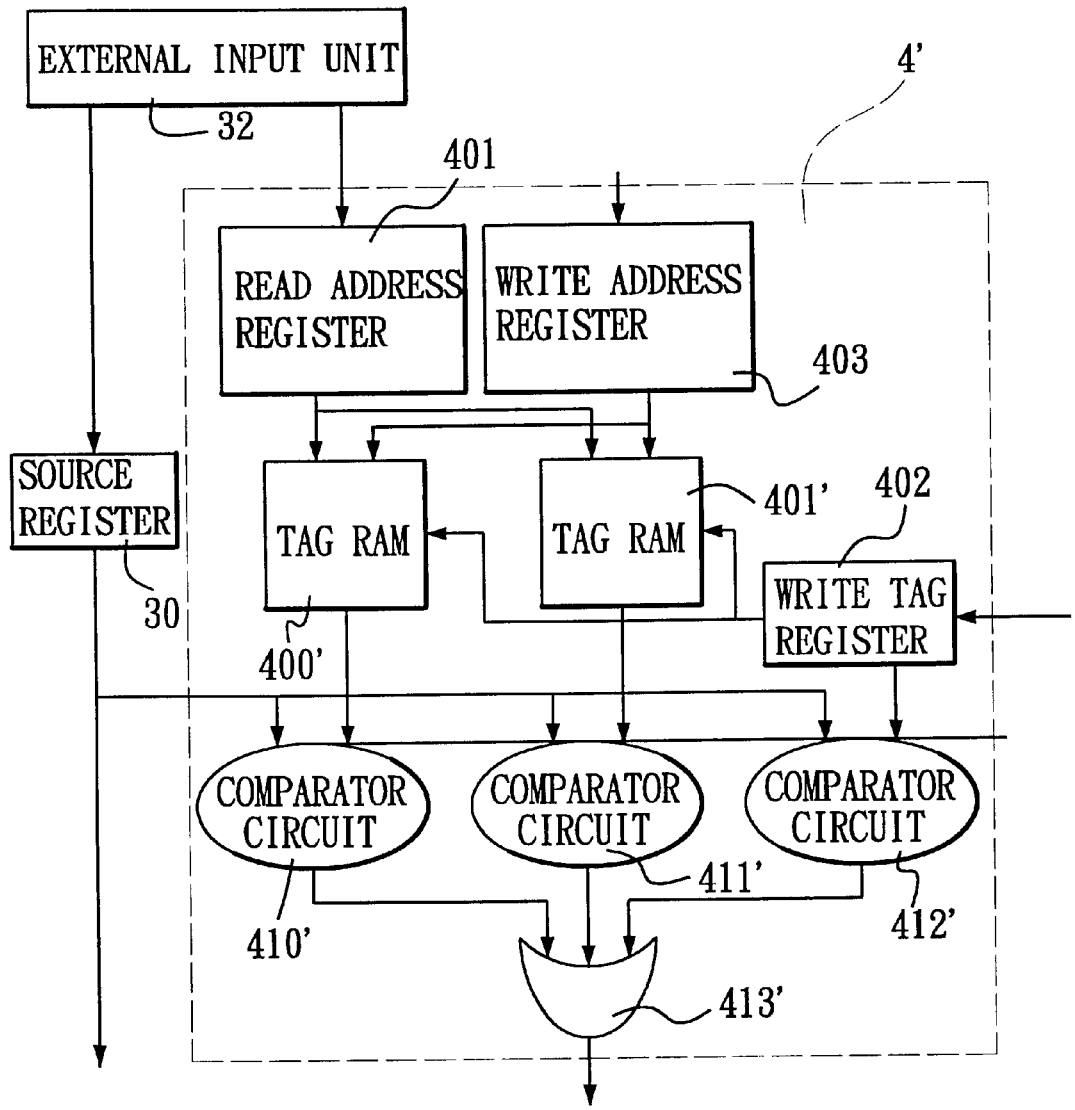
F I G. 7

NON-STALLING PIPELINE TAG CONTROLLER

BACKGROUND OF THE INVENTION

1. Field of the Invention

The invention relates to a tag controller for controlling cache memory data access of a cache memory module, more particularly to a non-stalling pipeline tag controller which is capable of handling consecutive cache tag accesses from an external input unit and which can be updated without stalling.

2. Description of the Related Art

In a computer system, a cache memory system is commonly employed to store selected memory data for ready access by a processor. The cache memory system generally includes a cache random-access-memory module or data RAM for storing the memory data, and a tag controller that includes a tag RAM and associated control logic for the tag RAM. The tag RAM stores indices or tags to the memory data in the data RAM. A "cache hit" occurs when the desired memory data resides in the cache memory system, whereas a "cache miss" occurs when the desired memory data does not reside in the cache memory system.

The actual transfer of data between the cache memory system and the processor is often conditioned by the results of a cache tag look-up. Minimizing cache storage latency is particularly challenging in that the processor must often stall until cache access has been validated. In addition, all cache data modifications must be reflected in the states of the tags in the tag RAM to maintain cache consistency.

FIG. 1 illustrates a conventional tag controller 1 with a pipeline architecture. The conventional tag controller 1 includes a tag register 10, an address register 11, a write register 12, a tag RAM 13, a comparator 14, and an arbitrator 15. An external input unit 2 is coupled to the tag controller 1 and provides an input tag and an index address during a cache tag access operation. The input tag is stored in the tag register 10, whereas the index address is stored in the address register 11. The tag RAM 13 outputs one of the tags stored therein according to the contents of the address register 11. The comparator 14 compares the output of the tag RAM 13 with the contents of the tag register 10. When a match is detected, the comparator 14 provides a "hit" signal to the arbitrator 15. The arbitrator 15 responds by providing a control signal to the data RAM (not shown) so do to enable access to the desired memory data. When a match is not detected, the comparator 14 provides a "miss" signal to the arbitrator 15. At this time, the arbitrator 15 performs an updating operation during a subsequent clock cycle, wherein the arbitrator 15 loads the contents of the tag register 10 during the previous clock cycle into the write register 12 and stores a replacement address into the address register 11. The input update tag from the external input 2 can thus be stored in a location of the tag RAM 13 specified by the replacement address.

From the foregoing, it is evident that the conventional tag controller 1 has the following pipeline stages: storage of an input tag; access of the tag RAM 13; comparison of tags; and arbitration of the replacement address and updating of the tag RAM 13. However, updating of the tag RAM 13 can cause stalling in the pipeline of the conventional tag controller 1. Because the tag RAM 13 has a single port, simultaneous read and write conflict must be avoided, thereby necessitating stalling for rearranging the read and write operations to ensure access of the tag RAM 13 at different times. Furthermore, because updating of the tag RAM 13 is deferred several cycles by the pipeline stages, subsequent tag requests should wait until the tag RAM 13 has been validated.

SUMMARY OF THE INVENTION

Therefore, the object of the present invention is to provide a non-stalling pipeline tag controller which is capable of handling consecutive cache tag accesses from an external input unit and which can be updated without stalling.

According to the present invention, a non-stalling pipeline tag controller is adapted to handle consecutive cache tag accesses from an external input unit and to control cache memory data access of a data memory module. The non-stalling pipeline tag controller comprises a source register, a holding register, a tag memory module, a status module and an arbitration module.

The source register is adapted to be coupled to the external input unit so as to receive and store a first source tag therefrom during a first clock cycle and so as to receive and store a second source tag therefrom during a second clock cycle.

The holding register is coupled to the source register. The holding register receives and stores the first source tag from the source register during the second clock cycle, and receives and stores the second source tag from the source register during a third clock cycle. The holding register is adapted to be coupled to the data memory module so as to provide the first source tag thereto during the third clock cycle.

The tag memory module includes a tag memory unit for storing tags to memory data in the data memory module. The tag memory unit is coupled to the holding register. The tag memory module further includes a first comparator unit coupled to the tag memory unit and the source register. The first comparator unit generates a first decision signal to indicate whether the source tag in the source register matches with one of the tags in the tag memory unit.

The status module includes a second comparator unit coupled to the source and holding registers. The second comparator unit generates a second decision signal to indicate whether the source tags stored in the source and holding registers match with one another. The status module further includes a decision unit coupled to the first and second comparator units. The decision unit compares the first and second decision signals and generates a third decision signal to indicate to occurrence of a cache hit or cache miss condition according to result of comparison made by the decision unit.

The arbitration module is coupled to the decision unit and the tag memory module. The arbitration module generates a control signal adapted to be provided to the data memory module so as to enable access to the data memory module according to the source tag from the holding register upon detection of the occurrence of the cache hit condition. The arbitration module generates a replacement address that is provided to the tag memory module so as to enable storage of the source tag from the holding register in the tag memory unit according to the replacement address in order to update contents of the tag memory unit upon detection of the occurrence of the cache miss condition.

BRIEF DESCRIPTION OF THE DRAWINGS

Other features and advantages of the present invention will become apparent in the following detailed description of the preferred embodiments with reference to the accompanying drawings, of which:

FIG. 3 is a schematic circuit block diagram of a tag memory module of the first preferred embodiment;

FIG. 5 is a schematic circuit block diagram of an arbitration module of the first preferred embodiment;

FIG. 7 is a schematic circuit block diagram of a tag memory module of the second preferred embodiment of a non-stalling pipeline tag controller according to the present invention.

DETAILED DESCRIPTION OF THE PREFERRED EMBODIMENT

Figure 1:
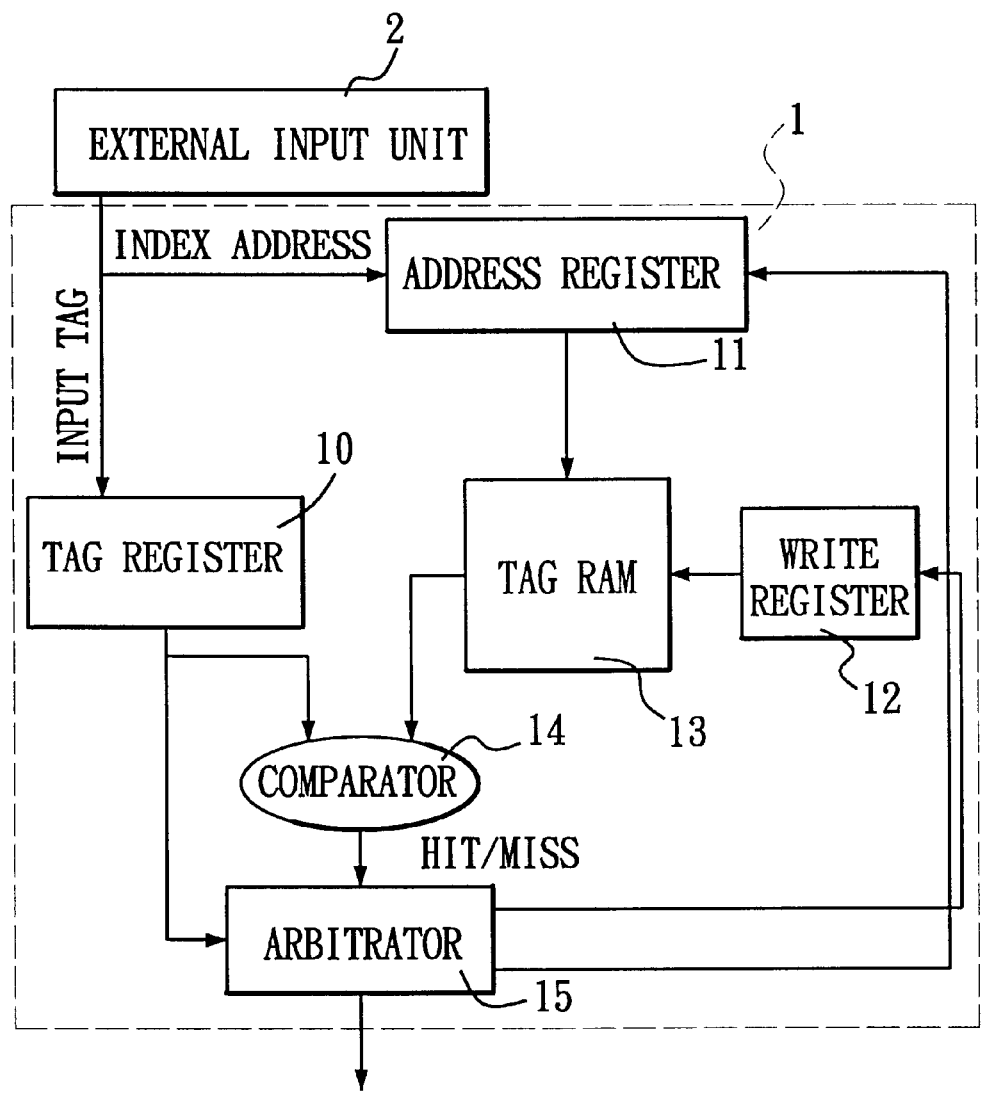
FIG. 1 is a schematic circuit block diagram showing a conventional tag controller with a pipeline architecture.
Figure 2:
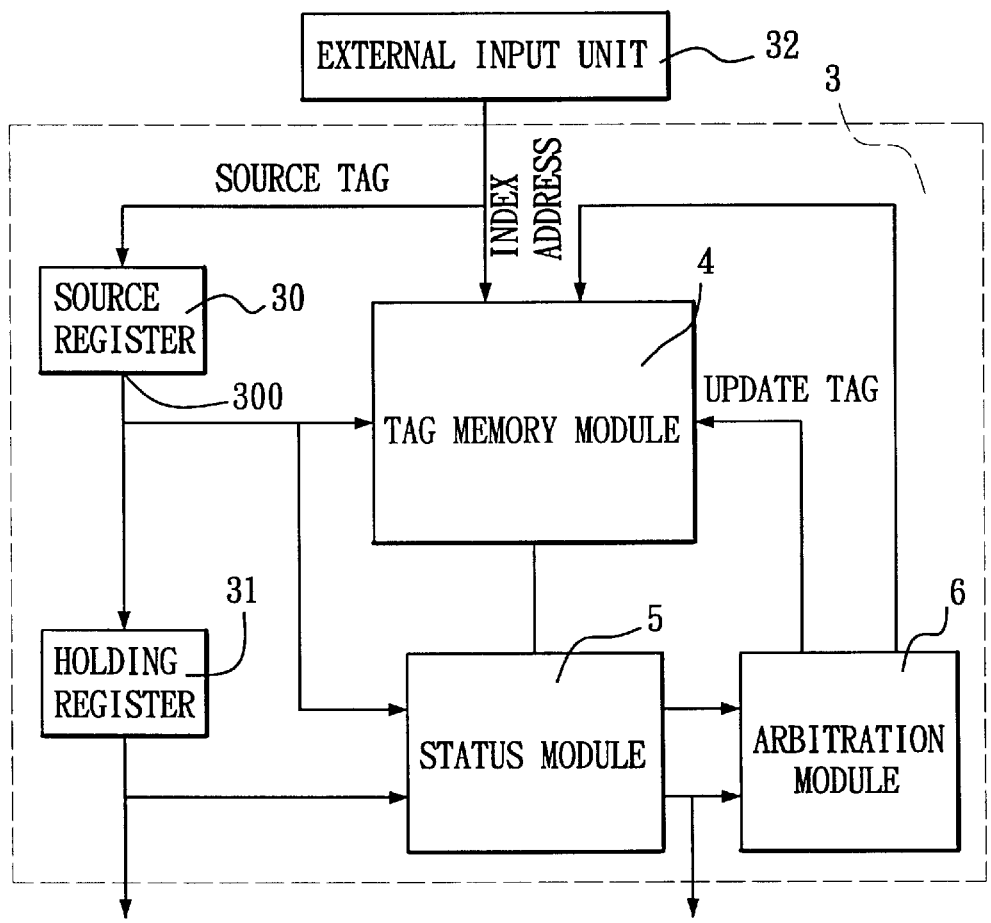
FIG. 2 is a schematic circuit block diagram of the first preferred embodiment of a non-stalling pipeline tag controller according to the present invention.

Before the present invention is described in greater detail, it should be noted that like elements are denoted by the same reference numerals throughout the disclosure. Referring to FIG. 2, the first preferred embodiment of a non-stalling pipeline tag controller 3 according to the present invention is shown to comprise source and holding registers 30, 31, a tag memory module 4, a status module 5 and an arbitration module 6.

An external input unit 32, such as a processor, is coupled to the tag controller 3 and provides a source tag and an index address during a cache tag access operation. The source register 30 receives and stores a first source tag from the external input unit 32 during a first clock cycle, and a second source tag from the external input unit 32 during a second clock cycle. The holding register 31 is coupled to the output end 300 of the source register 30, and receives stores the first source tag from the source register 30 during the second clock cycle, and the second source tag from the source register 30 during a third clock cycle. The holding register 31 is coupled to a data memory module 7 (see FIG. 5) so as to provide the first source tag thereto during the third clock cycle.

Referring to FIGS. 2 and 3, the tag memory module 4 includes a tag memory unit 40 and a comparator unit 41. The tag memory unit 40 includes a tag memory device or tag RAM 400, a read address register 401, a write tag register 402, and a write address register 403. The tag RAM 400 stores indices or tags to memory data in the data RAM 7 (see FIG. 5). The tag RAM 400 has a read address port, a write address port, a read data port, and a write data port. The read address register 401 has an input end that is coupled to the external input unit 32 so as to receive and store the index address therefrom, and an output end that is coupled to the read address port of the tag RAM 400. The tag RAM 400 outputs one of the tags specified by the index address stored in the read address register 401 at the read data port. The write tag register 402 is coupled to the holding register 31 and the write data port of the tag RAM 400. The write address register 403 is coupled to the arbitration module 6 and the write address port of the tag RAM 400. The write tag register 402 receives and stores an update tag from the holding register 31 therein, whereas the write address register 403 receives and stores a replacement address from the arbitration module 6 therein.

The comparator unit 41 includes a first comparator circuit 410, a second comparator circuit 411 and a logic-OR gate 412. The first comparator circuit 410 is coupled to the output end 300 of the source register 30 and the read data port of the tag RAM 400. The first comparator circuit 410 compares the output of the tag RAM 400 with the contents of the source register 30. A tag RAM hit event occurs when a match is detected. The second comparator circuit 411 is coupled to the output end 300 of the source register 30 and the output end 4020 of the write tag register 402. The second comparator circuit 411 compares the contents or the source and write tag registers 30, 402 to ensure coherence of the contents of the tag RAM 400. The logic-OR gate 412 receives output signals from the first and second comparator circuits 410, 411, and performs a logic operation thereon to result in a first decision signal. The first decision signal indicates whether the source tag stored in the source register 30 matches with one of the tags in the tag RAM 400.

Figure 4:
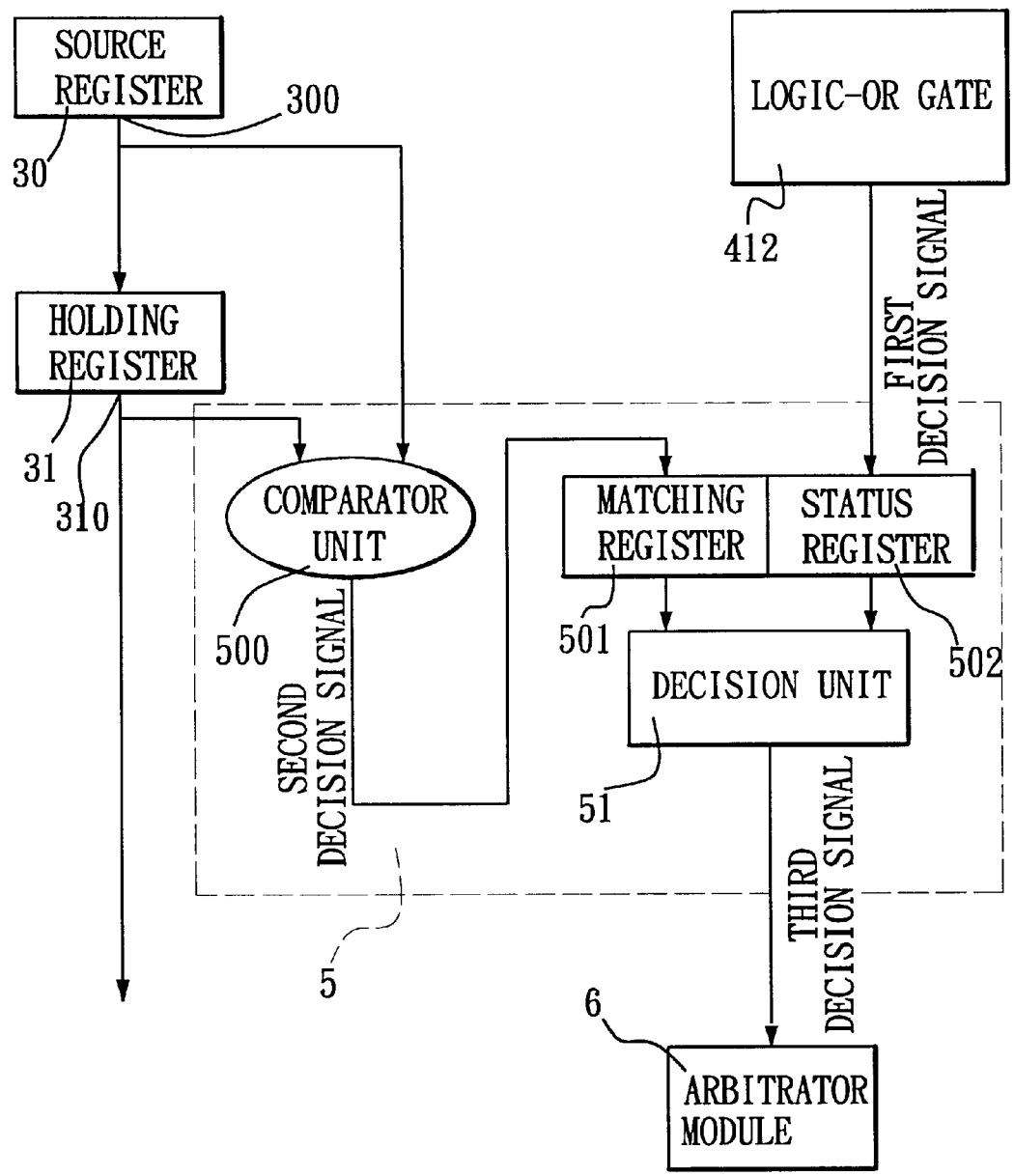
FIG. 4 is a schematic circuit block diagram of a status module of the first preferred embodiment.

Referring to FIGS. 2 and 4, the status module 5 includes a comparator unit 500, a matching register 501, a status register 502, and a decision unit 52. The comparator unit 500 is coupled to the output end 300 of the source register 30 and the output end 310 of the holding register 31. The comparator unit 500 compares the contents of the source and holding registers 30, 31, and generates a second decision signal to indicate whether the source tags stored in the source and holding registers 30, 31 match with one another. This is necessary to ensure proper updating of the tag RAM 400. The matching register 501 is coupled to the comparator unit 500, and receives and stores the second decision signal therein. The status register 502 is coupled to the logic-OR gate 412, and receives and stores the first decision signal therein. The decision unit 51 is coupled to the matching register 501 and the status register 502, and receives the first and second decision signals therefrom. The decision unit 51 compares the first and second decision signals, and generates a third decision signal to indicate occurrence of a cache hit or cache miss condition according to the result of the comparison made by the decision unit 51.

Referring to FIGS. 2 and 5, the arbitration module 6 is coupled to the decision unit 51 and the tag memory module 4, and includes an arbitrator 60 and a replacement address generator 61. The replacement address generator 61 is coupled to the output end 310 of the holding register 31, and selects a replacement address using known least-recently-used (LRU) or random address selection techniques. The arbitrator 60 is coupled to the decision unit 51, the replacement address generator 61 and the write address register 403 (see FIG. 4). In the event of a cache hit condition, the arbitrator 60 generates a control signal (not shown) that is provided to the data RAM 7 so as to enable access to the same according to the source tag from the holding register 31. In the event of a cache miss condition, the arbitrator 60 provides the replacement address from the replacement address generator 61 to the write address register 403 so as to enable writing of the update tag in the write tag register 402 into a location of the tag RAM 400 specified by the replacement address in order to update the tag RAM 400 (see FIG. 4).

Figure 6:
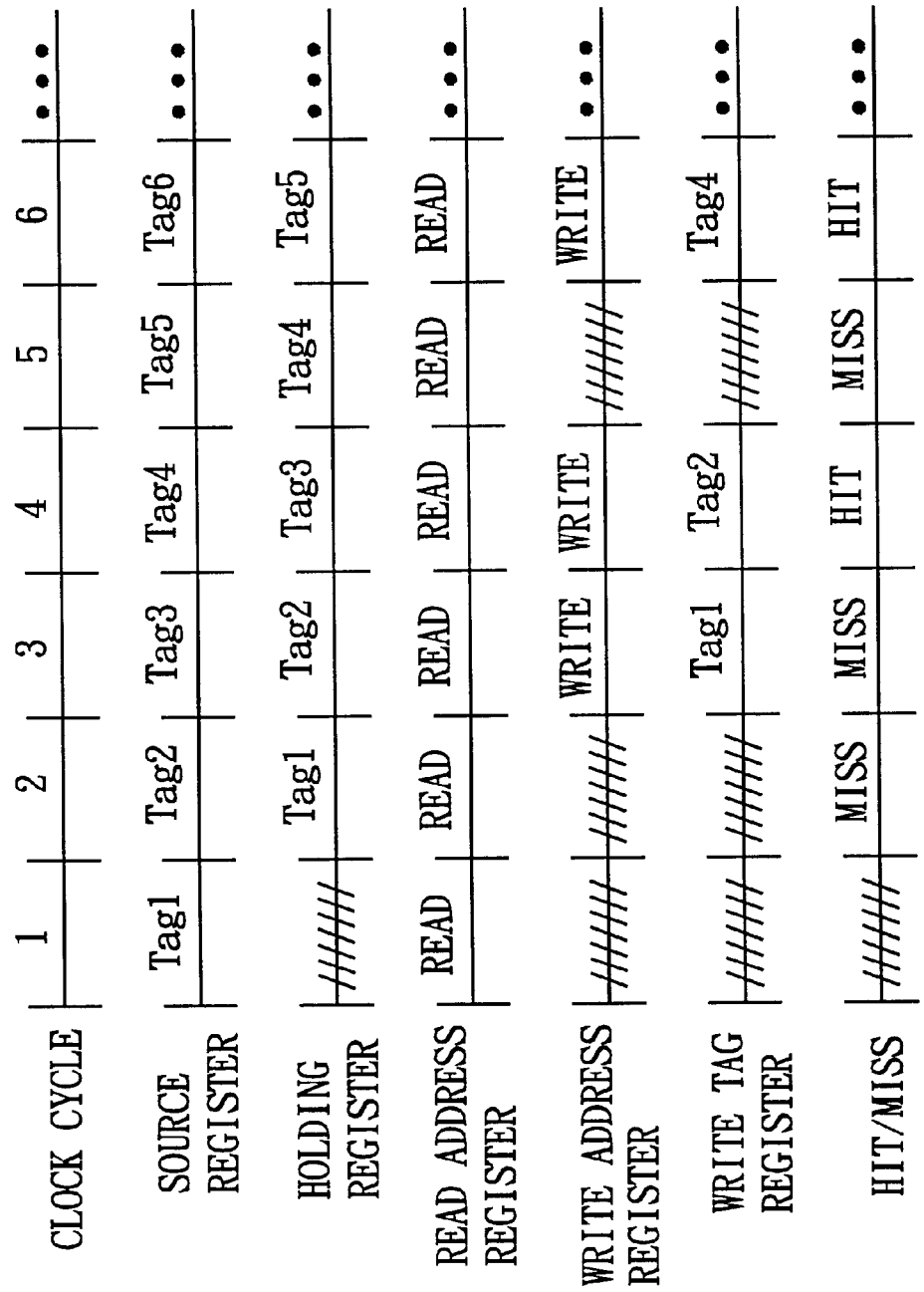
FIG. 6 is a timing diagram to illustrate the operation of the first preferred embodiment.

Referring to FIGS. 2, 3, 4 and 5, and with further reference to the timing diagram of FIG. 6, during a first clock cycle, a first source tag from the external input unit 32 is stored in the source register 30, and a first index address corresponding to the first source tag is stored in the read address register 401. The tag RAM 400 outputs one of the tags stored therein and addressed by the first index address in the read address register 401. The first comparator circuit 410 compares the first source tag stored in the source register 30 with the output of the tag RAM 400. At the same time, the second comparator circuit 411 compares the first source tag stored in the source register 30 with an update tag stored in the write tag register 402. The logic-OR gate 412 generates the first decision signal, which is stored in the status register 502, according to the output signals of the first and second comparator circuits 410, 411.

During a second clock cycle, the first source tag in the source register 30 is stored in the holding register 31, and a second source tag from the external input unit 32 is stored in the source register 30. The comparator unit 500 compares the contents of the source and holding registers 30, 31, and generates the second decision signal according to the result of the comparison made thereby. The second decision signal is stored in the matching register 501. The decision unit 51 compares the contents of the matching register 501 and the status register 502, and generates the third decision signal according to the result of the comparison made thereby. The third decision signal is sent to the arbitration module 6.

During a third clock cycle, the first source tag in the holding register 31 is outputted to the data RAM 7, the second source tag in the source register 30 is stored in the holding register 31, and a third source tag from the external input unit 32 is stored in the source register 30. At the same time, the arbitration module 6 determines whether the contents of the tag RAM 400 should be updated. If the third decision signal is a cache hit signal, the arbitrator 60 provides a control signal to the data RAM 7 such that the desired memory data can be accessed therefrom in accordance with the first source tag from the holding register 31. If the third decision signal is a cache miss signal, the first source tag from the holding register 31 is deemed to be an update tag that is loaded into the write tag register 402 for updating the contents of the tag RAM 400. At this time, the arbitrator 60 provides a replacement address from the replacement address generator 61 to the write address register 403, and the contents of the tag RAM 400 are updated accordingly by means of the contents of the write tag resister 402 and the write address register 403.

Thus, as shown in FIG. 6, regardless of whether a cache hit condition or a cache miss condition occurs, consecutive source tags from the external input unit can be processed by the pipeline tag controller of this invention. For example, even if a cache miss condition occurred during the second clock cycle, the third source tag can be received from the external input unit. Therefore, there is no need to wait for the contents of the tag RAM to be updated before processing of a subsequent source tag can begin. Stalling is thus avoided in the pipeline tag controller of this invention.

It should be noted that more than one tag RAM can be employed in the tag memory module of the pipeline tag controller of this invention, thereby requiring a corresponding increase in the number of comparator circuits used therein to implement the tag matching process. FIG. 7 illustrates a tag memory module 4' of the second preferred embodiment of a non-stalling pipeline tag controller according to the present invention. Unlike the previous embodiment, the tag memory module 4' includes two tag RAMs 400', 401', each of which is coupled to the read address register 401, the write tag register 402 and the write address register 403. A first comparator circuit 410' is coupled to the source register 30 and the tag RAM 400', and compares the output of the tag RAM 400' with the contents of the source register 30. A second comparator circuit 411' is coupled to the source register 30 and the tag RAM 401', and compares the output of the tag RAM 401' with the contents of the source register 30. A third comparator circuit 412' is coupled to the source register 30 and the write tag register 402, and compares the contents of the source and write tag registers 30, 402. A logic-OR gate 413' receives output signals from the first, second and third comparator circuits 410', 411', 412', and performs a logic operation thereon to result in the first decision signal that indicates whether the source tag stored in the source register 30 matches with one of the tags in the tag RAMs 400', 401'.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

We claim:

1. A non-stalling pipeline tag controller adapted to handle consecutive cache tag accesses from an external input unit and to control cache memory data access of a data memory module, said non-stalling pipeline tag controller comprising:

a source register adapted to be coupled to the external input unit so as to receive and store a first source tag therefrom during a first clock cycle and so as to receive and store a second source tag therefrom during a second clock cycle;

a holding register coupled to said source register, said holding register receiving and storing the first source tag from said source register during the second clock cycle, said holding register receiving and storing the second source tag from said source register during a third clock cycle, said holding register being adapted to be coupled to the data memory module so as to provide the first source tag thereto during the third clock cycle;

a tag memory module including a tag memory unit for storing tags to memory data in the data memory module, said tag memory unit being coupled to said holding register, said tag memory module further including a first comparator unit coupled to said tag memory unit and said source register, said first comparator unit generating a first decision signal to indicate whether the source tag in said source register matches with one of the tags in said tag memory unit;

a status module including a second comparator unit coupled to said source and holding registers, said second comparator unit generating a second decision signal to indicate whether the source tags stored in said source and holding registers match with one another, said status module further including a decision unit coupled to said first and second comparator units, said decision unit comparing the first and second decision signals and generating a third decision signal to indicate occurrence of a cache hit or cache miss condition according to result of comparison made by said decision unit; and an arbitration module coupled to said decision unit and said tag memory module, said arbitration module generating a control signal adapted to be provided to the data memory module so as to enable access to the data memory module according to the source tag from said holding register upon detection of the occurrence of the cache hit condition, said arbitration module generating a replacement address that is provided to said tag memory module so as to enable storage of the source tag from said holding register in said tag memory unit according to the replacement address in order to update contents of said tag memory unit upon detection of the occurrence of the cache miss condition.

2. The non-stalling pipeline tag controller of claim 1, wherein said tag memory unit comprises:
- a tag memory device for storing the tags therein, said tag memory device having a read address port, a write address port, a read data port and a write data port;
- a read address register coupled to said read address port of said tag memory device and adapted to be coupled to the external input unit so as to receive and store an index address therefrom, said tag memory device outputting one of the tags specified by the index address stored in said read address register at said read data port;
- a write tag register coupled to said holding register and said write data port of said tag memory device, said write tag register receiving and storing the source tag from said holding register therein; and
- a write address register coupled to said arbitration module and said write address port of said tag memory device, said write address register receiving the replacement address from said arbitration module and providing the replacement address to said tag memory device to enable writing of the source tag stored in said write tag register into a location of said tag memory device specified by the replacement address in order to update said tag memory device upon detection by said arbitration module of the occurrence of the cache miss condition.

3. The non-stalling pipeline tag controller of claim 2, wherein said first comparator unit includes:
- a first comparator circuit coupled to said source register and said read data port of said tag memory device, said first comparator circuit comparing the source tag in said source register with the tag outputted by said tag memory unit;
- a second comparator circuit coupled to said source register and said write tag register, said second comparator circuit comparing the source tags in said source and write tag registers; and
- a logic-OR gate coupled to said first and second comparator circuits, said logic-OR gate receiving output signals from said first and second comparator circuits and performing a logic operation thereon to result in the first decision signal.

4. The non-stalling pipeline tag controller of claim 1, wherein said status module further includes:
- a status register interconnecting said first comparator unit and said decision unit, said status register receiving the first decision signal from said first comparator unit and providing the first decision signal to said decision unit; and
- a matching register interconnecting said second comparator unit and said decision unit, said matching register receiving the second decision signal from said second comparator unit and providing the second decision signal to said decision unit.

5. The non-stalling pipeline tag controller of claim 1, wherein said arbitration module includes a replacement address generator for generating the replacement address, and an arbitrator coupled to said decision unit, said replacement address generator and said write address register, said arbitrator generating the control signal upon detection of the occurrence of the cache hit condition, and controlling updating of said tag memory unit upon detection of the occurrence of the cache miss condition.

* * * * *